United States Patent [19]
Affeldt et al.

[11] Patent Number: 5,651,446
[45] Date of Patent: *Jul. 29, 1997

[54] OPTOELECTRONIC OBJECT SPACING APPARATUS AND METHOD FOR OPERATING THE SAME

[75] Inventors: Henry A. Affeldt, Victorville; William Kirk, Alta Loma; Tim D. Conway, Stockton, all of Calif.

[73] Assignee: Sunkist Growers, Inc., Ontario, Calif.

[*] Notice: The term of this patent shall not extend beyond the expiration date of Pat. No. 5,174,429.

[21] Appl. No.: 617,970

[22] Filed: Mar. 11, 1996

Related U.S. Application Data

[63] Continuation of Ser. No. 201,516, Feb. 24, 1994, Pat. No. 5,513,740.

[51] Int. Cl.$^6$ ........................ B65G 43/00
[52] U.S. Cl. ........................ 198/464.4; 198/460.1; 198/779
[58] Field of Search .............. 198/460.1, 464.2, 198/464.4, 444, 502.4, 803.14, 794, 779, 637, 622, 459.1

[56] References Cited

U.S. PATENT DOCUMENTS

| | | | |
|---|---|---|---|
| 4,585,126 | 4/1986 | Paddock et al. | 198/803.14 X |
| 4,961,488 | 10/1990 | Steeghs | 198/357 |
| 5,141,097 | 8/1992 | Oiry et al. | 198/460.1 |
| 5,164,795 | 11/1992 | Conway . | |
| 5,174,429 | 12/1992 | Lavars et al. . | |
| 5,190,137 | 3/1993 | Tas | 198/779 X |
| 5,358,093 | 10/1994 | Gigante et al. | 198/444 X |
| 5,513,740 | 5/1996 | Affeldt et al. | 198/464.4 X |

FOREIGN PATENT DOCUMENTS

| | | | |
|---|---|---|---|
| 4129142 | 3/1992 | Germany | 198/464.4 |
| 0098414 | 6/1982 | Japan | 198/464.4 |
| 0098408 | 6/1982 | Japan | 198/464.4 |

*Primary Examiner*—D. Glenn Dayoan

[57] ABSTRACT

Fruit or other objects placed on the conveyor and spun by the conveyor are properly oriented on the conveyor by the method and apparatus of the invention by ejecting one or more adjacent touching objects or ejecting objects which form stacked triplets. An optical sensor determines when there is or is not a gap between objects and relates that gap detection to the position of the objects on the conveyor. Detection of a continuous signal through a controller circuit causes a downstream solenoid to be energized according to predetermined timing. The solenoid in turn, when energized, rotates a finger which is coupled to, carried with the conveyor system and situated underneath the pocket between adjacent spools. The finger rotates upwardly and ejects the objects sitting in the pocket, thereby removing the misplaced or touching objects on the conveyor belt.

4 Claims, 3 Drawing Sheets

OPTOELECTRONIC OBJECT SPACING APPARATUS AND METHOD FOR OPERATING THE SAME

BACKGROUND OF THE INVENTION

1. Cross Reference to Related Applications

This is a continuation of application Ser. No. 08/201,516 filed Feb. 24, 1994, now U.S. Pat. No. 5,513,240.

2. Field of the Invention

The invention relates to the field of fruit—or other object—handling machines and methods and in particular to apparatus and methods for separating objects on a conveyor system.

3. Description of the Prior Art

The sorting, grading, separation and handling of objects such as fruit, in particular citrus fruits, on conveyor systems in combination with many different types of apparatus including optically sensing devices is well known. An example of a photo-optical fruit grader assigned to the same assignee as the present invention is described by way of example in U.S. Pat. No. 5,164,795. In many of these fruit handling devices, such as the one example just referenced, it is necessary to rotate the fruit on the conveyor system in order to have the fruit properly optically scanned or otherwise handled.

The typical conveyor systems for moving and spinning the fruit is comprised of a conveyor with rotating spools connected by a chain. The spaces between adjacent spools define a pocket in which the fruit is intended to rest. The fruit, which may be of various sizes and even, from run to run, of various types, varying for example from large grapefruit to small limes or lemons, is loaded from hoppers onto the conveyor system through various means, which may involve spinning the spools, and are caused to be distributed in the pockets between the spools as the conveyor moves forward. In an ideal situation, one item of fruit will be positioned in each pocket between the pair of adjacent spools and will be spinning freely without touching the adjacent fruit in adjacent pockets.

However, because of the random nature of loading as well as the some random variation in the size and shape of the fruit, the ideal situation does not always occur. On occasion when fruit of sufficient size is loaded on the conveyor, adjacent pockets will contain fruit of such large diameters that the two large adjacent fruits will touch each other. The result of their touching can in some instances substantially interfere with or prevent the rotation of the fruit. Failure of adjacent fruit to rotate, may then in turn cause failure of the grading or handling system, so that the fruit is not scanned, is erroneously ejected, falls off the conveyor at an inappropriate place or the system otherwise mishandles the fruit. An example of this first type of misarrangement is diagrammatically shown in FIG. 2.

Secondly, it may also happen on occasion that smaller fruit may stack in the pocket in multiples or triplets as shown in FIG. 3. Two or more fruit may stack in a single pocket or a third fruit may be stacked in a pocket defined by the adjacent fruit themselves. The fruit handling device typically is not designed to handle fruit in this arrangement or any other arrangement other than a single item of fruit within in each pocket. Therefore, both the misarrangement of types of fruit as shown in FIGS. 2 and 3 and any other arrangement of fruit which results in any situation other than the ideal case must be detected and automatically dealt with to avoid mishandling.

Therefore, what is needed is some type of method and apparatus whereby misarrangements of fruit on a conveyor system in which the fruit is designed to be spun can be corrected.

BRIEF SUMMARY OF THE INVENTION

The invention is an apparatus and method for ensuring that a plurality of objects, such as citrus fruit, are appropriately disposed upon and separated from each other on a conveyor system designed to convey the objects or fruit through a processing or fruit handling apparatus. In the event that fruit loaded onto the conveyor system assumes a configuration which substantially interferes with the processing or, in the illustrated embodiment the rotation or spinning of the fruit, the apparatus detects the configuration and ejects at least one of the objects or fruit from the conveyor system to remove the interfering configuration.

It must be understood that the invention may be employed in conveyor systems which handle any type of object and that wherever a reference to "fruit" is made in the specification, it must be understood that any object could be considered as being substituted therefore with such modifications as would be matters of design choice to accommodate the different type of object.

More specifically, an optical sensor is placed above the conveyor system to detect the passing of fruit nested between adjacent spools. A received pulse indicative of the time during which a fruit is being sensed triggers a timer circuit, which is controllable through a potentiometer or through software control in a computer. A selected minimum time is set to correspond to the elapsed time from the end of that pulse (i.e., when the first fruit ceases to be sensed) to the beginning of the next pulse, which should begin when the next fruit is first sensed. If the fruit is in the desired arrangement in the pockets, i.e. the time during which the minimum gap between fruit would pass under the optical detector. If the next pulse is generated by the next arriving fruit before the minimum gap time, then the fruit are deemed to be too close. The second fruit will then be ejected. A secondary signal coming from a chain pin sensor, which directly senses the movement of the conveyor chain, is used to establish when a new pocket has arrived below the fruit sensor.

Again, while a chain conveyor is described, any type of conveyor system for moving, in a predetermined path, objects of any generally predetermined shape could equivalently be used. If the fruit are touching or are stacked, there is a constant detection of fruit by the optical sensor, while the chain pin sensor dictates that a new pocket has begun. In this case, there is no detected "space" or "gap" and the system generates a signal to remove the fruit in the second pocket. Any one of the interfering fruit could be ejected according to choice.

The optical sensor is coupled to a controller or computer subject to software control. The presence of a continuous "fruit" signal caused by the underlying fruit spanning the gap will then be detected by the controller circuit. The controller circuit will then activate a downstream solenoid according to predetermined timing. The solenoid in turn, when activated, moves a finger positioned in the pocket between selected ones of the spools, such as described in U.S. Pat. No. 5,174,429. In that referenced case, the finger is rotatably coupled to the conveyor chain or conveyor assembly to which the spools are also coupled, and thus move with the spools and remains in the center of the pocket between the spools. The finger will thus eject the fruit in the selected pocket into a recovery chute.

In the case of two large fruit which are touching, one of the fruit, for example the second one, will be ejected so that no two fruit are allowed to touch on the conveyor. In the case where a triplet of stacked fruit occurs, at least one of the stacked fruit, for example the second one, is ejected, either causing the third one of the fruit to fall within the adjacent pocket taking the place of the second fruit or to be ejected along with the second ejected fruit.

The invention may be better visualized by now turning to the following drawings wherein a preferred embodiment is illustrated and wherein like elements are referenced by like reference numerals.

The invention and its various embodiments may now be understood by turning to the following detailed description.

DETAILED DESCRIPTION OF THE PREFERRED EMBODIMENTS

Fruit placed on the conveyor and processed or handling, for example spun by the conveyor, is properly oriented on the conveyor by the method and apparatus of the invention by ejecting adjacent touching fruit or ejecting fruit which form stacked triplets. An optical sensor determines when a gap between the fruit fails to occur by detecting when fruit underlie the sensor disposed in the proximity of the conveyor system. Detection of missing gap through a controller circuit causes a downstream solenoid to be energized according to predetermined timing. The solenoid in turn, when energized, rotates a finger which is part of the conveyor system and is situated underneath the pocket between adjacent spools. The finger rotates upwardly and ejects the fruit sitting in the pocket, thereby removing the misplaced or touching fruit on the conveyor belt.

Figure 1:
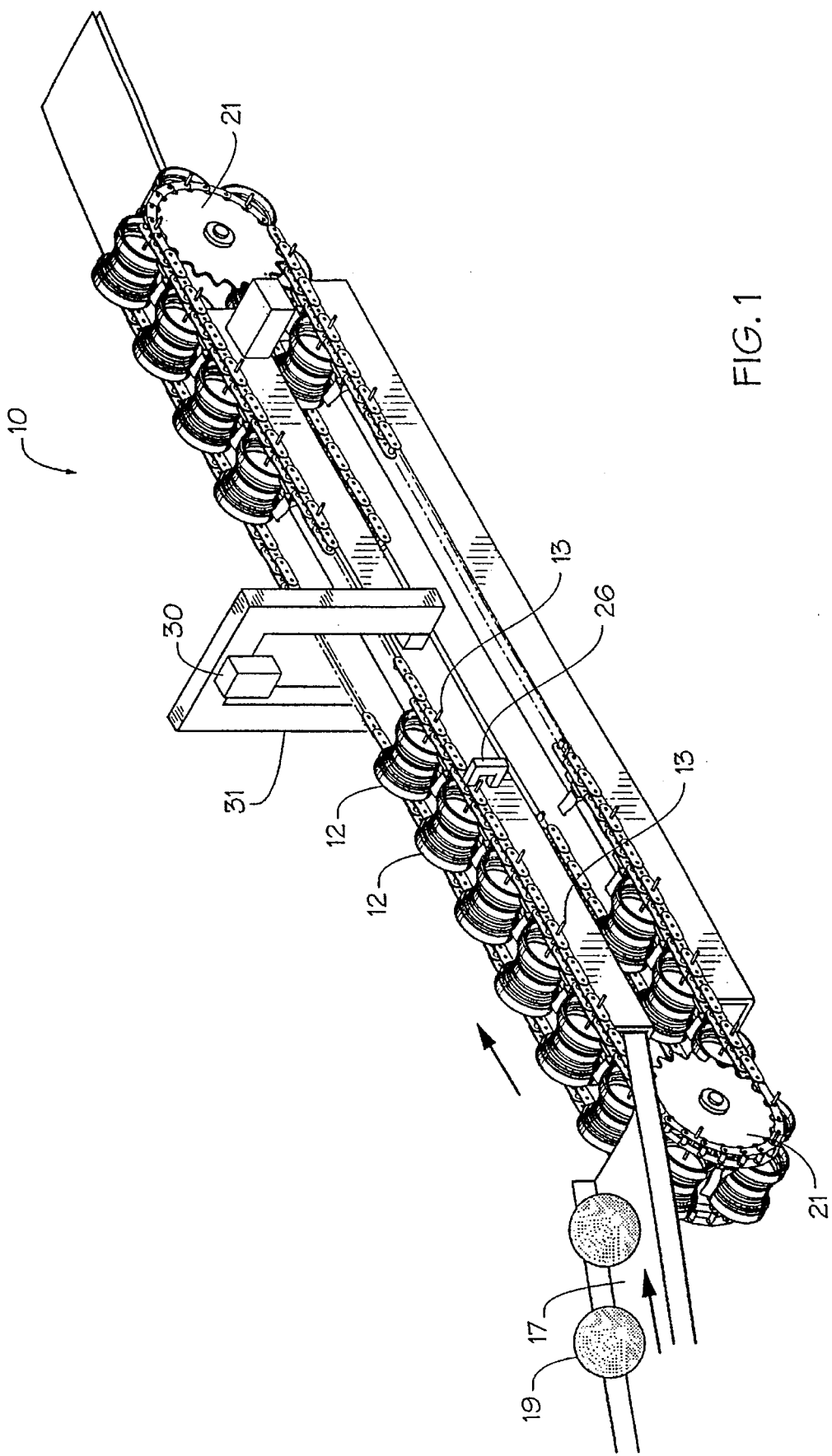
FIG. 1 is a perspective view of a conveyor system in which the invention has been incorporated.

FIG. 1 is a perspective view of a two-chain conveyor system 10 in which the improvements of the invention have been incorporated. This conveyor system 10 is comprised of a pair of chains 14 each of which rides within and is supported by a U-shaped track 16. Fruit 19 are loaded by conventional means 17 onto the end of conveyor system 10. Double chain 14 is supported at each end of system 10 by a pair corresponding sprocket wheels 21. In the illustrated embodiment, track 16 is inclined upwardly from the left to the right in FIG. 1. One of the pair of sprocket wheels 21 is driven at a constant angular speed, thereby producing a constant link/second linear speed of chain 14. An optical fruit sensor 30 is disposed on a frame 31 above conveyor 10 and is oriented to detect fruit passing underneath. Upstream from sensor 30 is a chain pin sensor 23. As discussed below, a plurality of spools 12 are disposed across double chain 14 on pins 13. The end of pins 13 extend out from track 16 and are detected by optical sensor 23 thereby giving a direct measurement of conveyor position, displacement and speed.

Alternatively, a single-chain conveyor (not shown) could be employed. As is well known in the art, in such a system, a pair of pins 13, on each of which a spool 12 rotates, extends transversely from a single chain 14, supported by a single track 16 (in T-shaped manner) driven by a single sprocket driving wheel 21.

Figure 2:
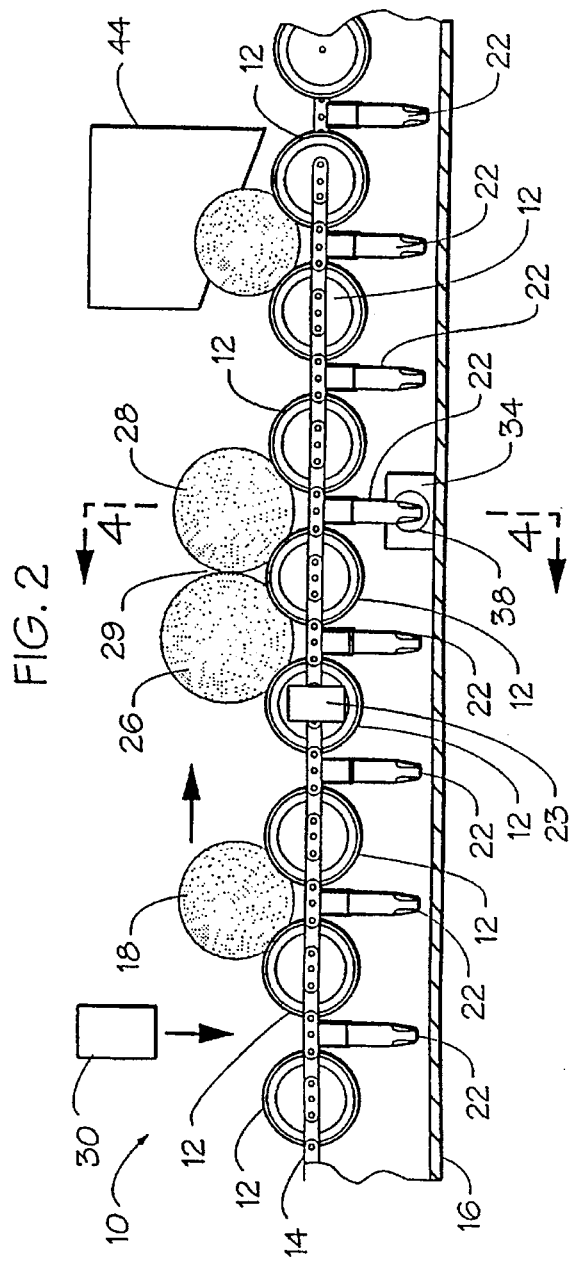
FIG. 2 is a diagrammatic side view in enlarged scale of the conveyor system of FIG. 1 having oversized fruit upon it creating a situation of touching fruit, which requires correction.

FIG. 2 is a diagrammatic cross sectional side view in enlarged scale of a portion of conveyor system 10 showing plurality of spools 12 rotating on pins 13 coupled across chain 14 and riding on conveyor track 16. Conveyor system 10 is designed to spin spools 12 so that fruit 18, disposed within the interstitial spaces between the spools, denoted as pockets 20, are also spun at a predetermined rate. It must be understood that the nature of the fruit handling is largely immaterial to the invention and any type of processing is within the scope of the invention as long as separation of the fruit is required or desirable. Conveyor system 10 is conventional and further descriptions of such conveyors can be found in the aforementioned U.S. Pat. No. 5,174,429 assigned to the same assignee as the present invention, which is herein expressly incorporated by reference.

In the conveyor system of the embodiment, beneath each pocket 20 is a rotatable finger 22 which is coupled to and rides along with chain 14 and spools 12. Finger 22 as digrammatically shown in a perpendicular cross sectional view taken through section lines 4—4 of FIG. 3 and as shown in FIG. 4 is pivoted about a pivot pin 24 coupled to chain 14 to allow finger 22 to rotate in a counterclockwise direction as seen in FIG. 4. As stated, finger 22 and its pivot pin 24 are coupled as part of the conveyor chain mechanism of conveyor system 10 in a manner such as shown in aforementioned U.S. Pat. No. 5,174,429 so that finger 22 is carried along with spools 12 and maintained approximately in the center of each pocket 20. A conventional hinge stop or other mechanical means limits the clockwise rotation of finger 22 to the lower limit depicted in FIG. 4 where upper arm 42 of finger 22 is approximately parallel with the axis of spools 12 or pins 13. Because of the weight or mass distribution of finger 22, a counterclockwise torque is applied to finger 22 about pivot axis 24, and finger 22 is urged by gravity to rotate in a clockwise direction in FIG. 4. Unless acted upon by other forces, finger 22 will always be in a lowered or inactive position as depicted in FIG. 4.

We turn first to the situation in FIG. 2 wherein the positioning of two large fruit 26 and 28 are shown as disposed in adjacent pockets 20 between spools 12. It is assumed in the illustration of FIG. 2 that the diameter of fruits 26 and 28 are so large that they are touching and interfering with or preventing the proper rotation of the fruits. In this case, the fruits must be separated so that no two adjacent fruits will touch in order for correct fruit handling to occur later downstream within conveyor system 10, which fruit handling means is not shown and which is not necessarily relevant to the invention. The particular fruit grading or handling which may be occurring in combination with conveyor system 10 of the invention is not material to the scope of the invention and may include any type of fruit handling now known or later devised in which proper separation and/or spinning of the fruit is required.

In the situation of FIG. 2, an optical sensor 30 is positioned above conveyor system 10 and is downwardly directed toward spools 12 and the fruit. As diagrammatically depicted in FIG. 4 sensor 30 is electrically coupled to a controller or computer circuit 32. Controller 32 in turn is coupled to and drives a solenoid 34 which is positioned at an ejection station generally denoted by reference numeral 36. Sensor 30 in combination with controller 32 is able to discriminate when there is no gap 29 between fruit 26 and 28 passing beneath it, as opposed to when there is a normal gap 27 between fruits 18.

In the situation of FIG. 2, sensor 30 will fail to detect a gap 29 between fruits 26 and 28 when those fruits pass beneath it. Conveyor system 10 is moving, for example to the right in FIG. 2, and therefore the rate at which spools 12 pass under sensor 30 is predetermined and usually constant, typically 30 inches/second. A continuous pulse or consecutive close pulses from sensor 30, as detected by controller 32, is thus indicative of the failure to detect a passing gap, or indicates that two adjacent fruit are too close together or touching. In the situation of FIG. 2, this failure will be caused by fruit 26 and 28 providing a continuous pulse without a break during a time interval when a pocket is known to be passing under sensor 30, as determined from chain pin sensor 23 by controller circuit 32. Thus conveyor speed need not be constant or even known, if through pin detection it can be determined in controller circuit 32 that a portion of chain 14 is passing underneath sensor 30 which would normally include a gap if the fruit were not touching or interfering with each other. Alternatively, if conveyor speed is constant, a minimum time period should elapse after a fruit detection signal from sensor 30 is received. Variable conveyor speeds may be measured by sensor 23 and converted into a minimum gap time using pulses from sensor 23 as a variable clock signal.

Figure 5:
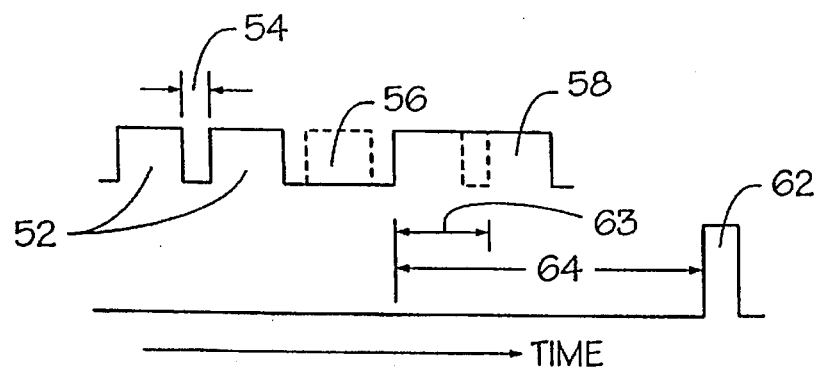
FIG. 5 is a simplified timing diagram showing fruit sensor pulses in relation to time gaps which occur corresponding to the presence or absence of gaps between the fruit on the conveyor system.

FIG. 5 is a simplified timing diagram which illustrates the point. Pulses 52 are signals from sensor 30 which indicate normally spaced fruit in pockets 20. Time gap 54 represents the time gap between normally spaced fruit which equals or exceeds a minimum time gap 60 set within controller circuit 32. Time gap 54 is detected within a predetermined time interval 63 after the rising edge of the preceding pulse 52.

Time gap 56 represents an empty pocket with no fruit passing beneath sensor 30. No rejection signal is generated because at least the minimum time gap 60 has occurred within predetermined time interval 63 after the rising edge of the last preceding sensor pulse 52.

Pulse 58 represents sensor signal 30 when two or more items of fruit are touching or occupying two adjacent pockets. Because no minimum gap time 60 is detected within a predetermined time interval 63 after the receipt of a fruit sensing pulse, the rising edge of pulse 58, an error or ejection signal 62 will be generated. At a predetermined time interval 64 after pulse 58, a trigger signal 62 is generated and sent to ejection solenoid 34. In the diagram of FIG. 5, ejection pulse 62 is shown as being timed relative to the rising edge of pulse 58, but it could be timed relative to any event corresponding to pulse 58.

Controller 32 thus detects the missing or closely consecutive pulses and generates a drive signal to activate solenoid 34. Solenoid 34, when energized, drives an armature 38 to the right in FIG. 4 thereby engaging lower arm 40 of finger 22. Finger 22 thus rotates in a counterclockwise direction as shown in FIG. 4, or about pivot pin 24, causing an upper arm 42 to contact the fruit 26 at the appropriate time, after which conveyor system 10 has moved fruit 26 and its corresponding finger 22 in position in front of solenoid 34.

The misplaced fruit 26, which in this case is the aftermost item or second of fruit in the situation of FIG. 2, is then ejected from conveyor system 10 into a recovery chute 44. The ejected fruit can be handled by conventional means, and can be returned on a conveyor to loading bin 17 and reloaded onto conveyor system 10 for rehandling.

The timing and spacing between the position of sensor 30, solenoid 34 and ejection chute 44 are determined according to conventional principles largely dependent upon the speed of conveyor system 10 and the spacing between spools 12. As shown in FIG. 2, solenoid 34 is downstream from the detection point of sensor 30, and fruit ejector chute 44 in turn is downstream by a predetermined distance from solenoid 34, all of which distances are determined through conventional experience or trial and error to reliably sense, eject and recover the ejected fruit in a reliable sequence. Chain pin sensor 23 may be disposed at any convenient location within system 10, and any means for measuring or sensing the displacement of chain 14 may be substituted and used.

For example, in the illustrated embodiment with a conveyor speed of approximately 30 inches per second and a spool-to-spool spacing of approximately 3.75 inches, solenoid 34 is positioned downstream from the center line of sensor 30 by four interspool distances or approximately 15.175 inches from the center line of the effective action of solenoid 34. The beginning edge of recovery chute 44 then lies approximately 4.81 inches downstream from the center line of the effective action of solenoid 34. The after edge of chute 44 extends to 16.31 inches from the center line of the effective action of solenoid 34. Clearly, the dimensions and spacings involved in any particular embodiment will vary depending upon all the variables which make up the system, such as fruit size, interspool distance, conveyor speed, and the like.

Figure 3:
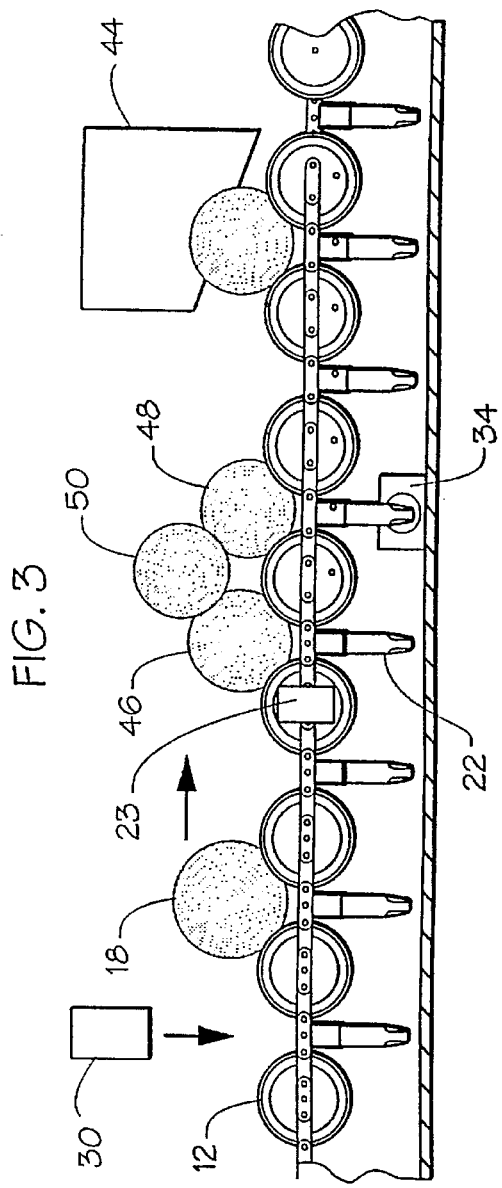
FIG. 3 is a diagrammatic side view of a conveyor system of the type shown in FIG. 2 showing a second situation in triples or multiple stacked fruit, which requires correction.
Figure 4:
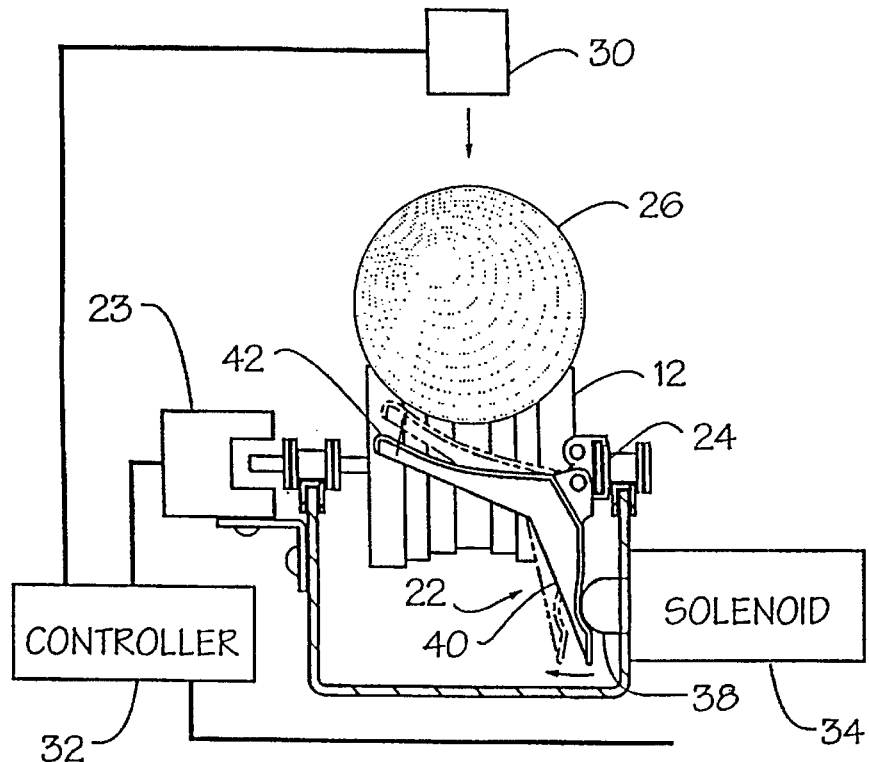
FIG. 4 is a diagrammatic elevational view taken through section lines 4—4 of FIG. 2 in a plane perpendicular to the plane depicted in FIG. 2.

FIG. 3 represents a second situation in which the fruit configuration will need to be corrected according to the invention. In the situation of FIG. 3, smaller fruit have collected to form a triplet comprised of an item of fruit 48 in a first pocket, a second item of fruit 46 in an adjacent upstream pocket 20, and between fruits 46 and 48 a third fruit 50. Again rotation of fruits 46, 48 and 50 will be substantially interfered with or prevented by the misalignment of the fruit on the conveyor system 10.

Sensor 30 will again sense the absence of a gap between the fruits at the appropriate time. As described above, this will cause an error determination to be made within controller 32 and a drive signal provided at the appropriate time to solenoid 34. Solenoid 34 will impel finger 22 under the appropriate pocket downstream at an appropriate time to eject fruit 46 from its position into chute 44. In the course of ejection of fruit 46, fruit 50 will also be ejected or otherwise dislodged so that it comes to rest within pocket 20 previously occupied by ejected fruit 46.

Many alterations and modifications may be made by those having ordinary skill in the art without departing from the spirit and scope of the invention. Therefore, it must be understood that the illustrated embodiment has been set forth only for the purpose of example and that it should not be taken as limiting the invention as defined by the following claims.

For example, the illustrated embodiment has been described in the context of detection of fruit from which gaps or lack of gaps are deduced. It is also to devise an equivalent apparatus and methodology which directly detects the gaps or presences of underlying portions of spools which are not obscured by the fruit.

It is well known that the fruit and the spools will generally have distinct optical reflection properties, and they can be optically distinguished by conventional means. An error condition is then generated not upon the presence of fruit beneath sensor 30 at the inappropriate time, but the absence of a detected spool at the appropriate time. This difference in optical reflection properties between the spools and fruit also serves to distinguish them in the foregoing illustrated embodiment.

Still further, computer driven pattern recognition can also be used to detect, in two dimensions, the existence of an inappropriate collection of fruit. The simple optical beam detector of the illustrated embodiment will then be replaced by a two dimensional scanning or matrix digital or television camera coupled to a graphics computer controlled by pattern recognition software.

The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

We claim:

1. An apparatus for spacing objects on a conveyor comprising a plurality of object supporting elements with substantially uniform mutual linear spacing within said conveyor, comprising:

sensor means for observing said conveyor and detecting a continuous region thereof in which the number of objects supported exceeds the number of object supporting elements; and removal means for removing at least one of said objects from said region, said sensor means in controlling communication with said removal means, wherein said conveyor comprises a linear sequence of object supporting elements, and said object supporting elements are mutually spaced substantially uniformly along the linear dimension of said conveyor, wherein each of said object supporting elements comprises a linearly sequential pair of bearing means, and each of said objects is preferably supported by two such linearly adjacent bearing means, and wherein said sensor means detects the presence of an object on said conveyor which is not supported by two linearly adjacent bearing means.

2. An apparatus for spacing objects on a conveyor comprising a plurality of object supporting elements with substantially uniform mutual linear spacing within said conveyor, comprising:

sensor means for observing said conveyor and detecting a continuous region thereof in which the number of objects supported exceeds the number of object supporting elements; and removal means for removing at least one of said objects from said region, said sensor means in controlling communication with said removal means, wherein said conveyor comprises a linear sequence of object supporting elements, and said object supporting elements are mutually spaced substantially uniformly along the linear dimension of said conveyor, wherein each of said object supporting elements comprises a linearly sequential pair of bearing means, and each of said objects is preferably supported by two such linearly adjacent bearing means, wherein said removal means comprises an ejection finger positioned between linearly adjacent said bearing means, said ejection finger selectively rotatable about an axis parallel to the linear dimension of said conveyor, and wherein said sensor means detects the presence of an object on said conveyor which is supported, at least in part, by said ejection finger.

3. An apparatus for spacing objects on a conveyor comprising a plurality of object supporting elements with substantially uniform mutual linear spacing within said conveyor, comprising:

sensor means for observing said conveyor and detecting a continuous region thereof in which at least two objects supported are mutually separated by less than a selected distance; and removal means for removing at least one of said objects from said region, said sensor means in controlling communication with said removal means, wherein said sensor means generates a continuous signal while said sensor means detects a plurality of objects in physical contact, and further comprising means to detect the number of object supporting elements by which said sequence of objects in physical contact is supported.

4. An apparatus for spacing objects on a conveyor comprising a plurality of object supporting elements with substantially uniform mutual linear spacing within said conveyor, comprising:

sensor means for observing said conveyor and detecting a continuous region thereof in which at least two objects supported are mutually separated by less than a selected distance; and removal means for removing at least one of said objects from said region, said sensor means in controlling communication with said removal means, wherein said conveyor comprises a linear sequence of object supporting elements, and said object supporting elements are mutually spaced substantially uniformly along the linear dimension of said conveyor, wherein each of said object supporting elements comprises an pair of linearly sequential bearing means, and each of said objects is preferably supported by two adjacent such bearing means, wherein said sensor means detects the presence of an object on said conveyor which is not supported by two linearly adjacent bearing means.

* * * * *